(No Model.)
W. H. BOGGS.
LAND MARKER.
No. 401,679. Patented Apr. 16, 1889.
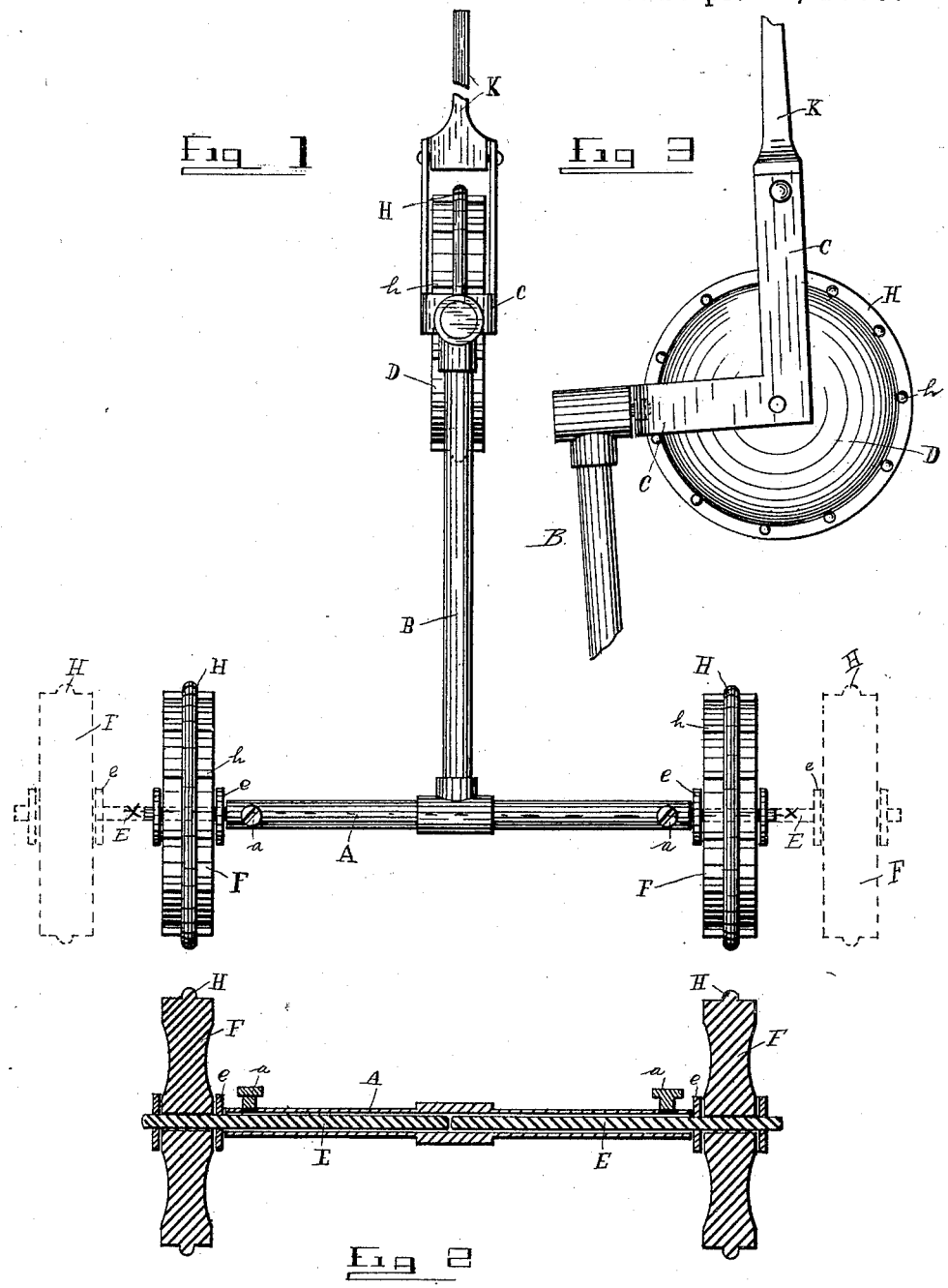
WITNESSES.
INVENTOR.
W. H. Boggs
by:
Attorney.

UNITED STATES PATENT OFFICE.

WILLIAM H. BOGGS, OF COVINGTON, OHIO.

LAND-MARKER.

SPECIFICATION forming part of Letters Patent No. 401,679, dated April 16, 1889.

Application filed September 20, 1888. Serial No. 285,885. (No model.)

*To all whom it may concern:*

Be it known that I, WILLIAM H. BOGGS, of Covington, in the county of Miami and State of Ohio, have invented certain new and useful Improvements in Land-Markers; and I do hereby declare that the following is a full, clear, and exact description thereof, reference being had to the accompanying drawings, and to the letters of reference marked thereon, which form part of this specification.

This invention relates to improvements in that class of agricultural implements known as "land-markers," and it has for its objects to check off rows in which the seed or other grain is to be planted, so that they will be parallel with one another, and also to make cross-checks on these rows at any predetermined distance apart for the purpose of allowing the grain to be planted in hills at equal distances from each other and the adjustment of the rear wheels of the marker by means of arms adjustably secured in the rear hollow axle of the marker; and to these ends the invention consists in the construction and novel arrangement of parts, hereinafter described and claimed.

In the accompanying drawings Figure 1 represents a top view of my improved marker with the marker-wheels in normal position and with the wheels and axles extended in dotted lines. Fig. 2 is a sectional view on line $x$ $x$, Fig. 1. Fig. 3 is a detail view of the L-shaped bracket for the front wheel.

Before proceeding with the description of my invention I will say that I prefer constructing the frame-work of the machine of metal tubing for the sake of economy and strength.

Referring to the drawings by letters, A represents the axle, which is provided at its center with a T-joint, in which is secured a rod or bar, B, which forms as it were the back-bone of the device. To the forward end of this rod B is secured an L-joint. Pivotally attached to the lower end of said joint is an L-shaped bracket, C, being U shape in cross-section, and at the angle of which is journaled the forward marker-wheel, D, and between the forwardly-projecting arms of this L-shaped bracket is pivotally secured a handle, K, by which the marker is drawn when operated.

The rear axle, A, is hollow, and is provided, near its outer ends, with set-screws $a$ $a$, for a purpose hereinafter described. In the outer ends of this hollow axle are fitted sliding or adjustable spindles or arms E E, which arms carry on their outer ends the rear marker-wheels, F F. Near the outer ends of these arms are bosses $e$ $e$, against which the wheels F F bear. When the arms have been adjusted to spread the wheels at any predetermined distance apart the set-screws $a$ $a$ are tightened, thus securely holding them in position.

The wheels F F and D may be constructed of any suitable material, and are provided with central circumferential flanges, H, for a purpose hereinafter specified. In these flanges are holes or perforations at equal distances around the circumference thereof for the reception of marking-pins $h$ $h$, which should fit snugly in the perforations. The perforations are made so that one portion of their inner edges will be flush with the periphery of the wheel, so that the pins when fitted into the holes will be supported from end to end, as seen in the drawings. When it is desired to use the marker, the back wheels are adjusted to any desired distance apart, or so that the width of the machine will be equal to the desired width of three rows. The pins $h$ $h$ are then arranged in place by removal or insertion, according to the distance it is desired to have the hills apart. The device is then ready for use and can be drawn across the ground to be laid off, the flanges on the wheels making long parallel rows, and the pins $h$ $h$ making short cross-marks for the purpose of indicating places where the grain is to be planted.

Having described my invention, I claim—

1. In a land-marker, the wheels F F and D, formed or provided with a central circumferential flange in which are equidistant perforations, in combination with removable marking-pins $h$ $h$, all substantially as and for the purpose specified.

2. In a land-marker, the combination of a hollow axle with two arms adjustably secured in the opposite ends of said axle and the marker-wheels on the outer extremities of said arms, constructed and arranged substantially as described, for the purpose specified.

3. The combination, in a land-marker, of the forward or central marking-wheel, journaled in an L-shaped bracket pivotally attached to the forward end of the frame, with the rear marking-wheels mounted on adjustable arms, all substantially as and for the purpose set forth.

4. The within-described land-marker, consisting of hollow axle A, adjustable arms E E, marking-wheels F F, set-screws $a\ a$, T-joint and bar B, L-joint, bracket C, and handle or tongue K, all constructed and arranged to operate substantially in the manner as and for the purpose described.

In testimony that I claim the foregoing as my own I affix my signature in presence of two witnesses.

WILLIAM H. BOGGS.

Witnesses:
SAMUEL H. BARNHART,
J. E. MILLER.